(12) United States Patent
Deniau et al.

(10) Patent No.: US 8,751,092 B2
(45) Date of Patent: *Jun. 10, 2014

(54) PROTOCOL PROTECTION

(75) Inventors: Jean-Christophe Deniau, Fenton, MI (US); Brian J. Farrell, Troy, MI (US); Yasser Gad, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 511 days.

This patent is subject to a terminal disclaimer.

(21) Appl. No.: 13/005,865

(22) Filed: Jan. 13, 2011

(65) Prior Publication Data

US 2012/0185110 A1   Jul. 19, 2012

(51) Int. Cl.
*G06F 7/00* (2006.01)
(52) U.S. Cl.
USPC .......... 701/29.1; 714/758; 714/799; 714/807; 714/819; 340/442
(58) Field of Classification Search
USPC .......... 714/758, 799, 807, 808, 819; 709/230, 709/236; 340/442
See application file for complete search history.

(56) References Cited

U.S. PATENT DOCUMENTS

| | | | |
|---|---|---|---|
| 2,428,089 A | 9/1947 | Mumma et al. |
| 2,451,859 A | 10/1948 | Mumma et al. |
| 3,777,062 A | 12/1973 | Ogawa |
| 3,814,839 A | 6/1974 | Lubarsky et al. |
| 3,814,840 A | 6/1974 | Lubarsky et al. |
| 4,703,359 A | 10/1987 | Rumbolt |
| 4,734,674 A | 3/1988 | Thomas et al. |
| 4,737,761 A | 4/1988 | Dosjoub et al. |
| 4,742,857 A | 5/1988 | Gandhi |
| 4,774,511 A | 9/1988 | Rumbolt et al. |
| 4,924,210 A | 5/1990 | Matsui et al. |
| 4,959,810 A | 9/1990 | Darbee |
| 4,999,622 A | 3/1991 | Amano et al. |
| 5,061,917 A | 10/1991 | Higgs et al. |
| 5,196,682 A | 3/1993 | Englehardt |
| 5,201,067 A | 4/1993 | Grube |
| 5,223,844 A | 6/1993 | Mansel |
| 5,228,077 A | 7/1993 | Darbee |
| 5,231,872 A | 8/1993 | Bowler et al. |

(Continued)

FOREIGN PATENT DOCUMENTS

| DE | 4492128 | 6/1996 |
|---|---|---|
| DE | 19503756 | 8/1996 |

(Continued)

OTHER PUBLICATIONS

International Search Report dated Apr. 19, 2012, from corresponding International Patent Application No. PCT/US2012/021082.

(Continued)

*Primary Examiner* — Thomas Black
*Assistant Examiner* — Peter D Nolan

(57) ABSTRACT

A system is provided for generating data packets of a message according to a first protocol, then analyzing the message according to a second protocol. The system determines if the message provides a correct checksum according to the second protocol. If the message provides the correct checksum according to the second protocol, the system alters the message and transmits the message according to the first protocol.

25 Claims, 4 Drawing Sheets

(56) References Cited

U.S. PATENT DOCUMENTS

| | | |
|---|---|---|
| 5,243,430 A | 9/1993 | Emmons |
| 5,255,313 A | 10/1993 | Darbee |
| 5,303,259 A | 4/1994 | Loveall |
| 5,335,540 A | 8/1994 | Bowler et al. |
| 5,365,225 A | 11/1994 | Bachhuber |
| 5,414,761 A | 5/1995 | Darbee |
| 5,455,570 A | 10/1995 | Cook et al. |
| 5,515,052 A | 5/1996 | Darbee |
| 5,537,463 A | 7/1996 | Escobosa |
| 5,540,092 A | 7/1996 | Handfield et al. |
| 5,552,917 A | 9/1996 | Darbee |
| 5,562,787 A | 10/1996 | Koch et al. |
| 5,564,101 A | 10/1996 | Eisfeld et al. |
| 5,581,023 A | 12/1996 | Handfield et al. |
| 5,585,554 A | 12/1996 | Handfield et al. |
| 5,600,301 A | 2/1997 | Robinson, III |
| 5,602,524 A | 2/1997 | Mock et al. |
| 5,614,906 A | 3/1997 | Hayes et al. |
| 5,624,265 A | 4/1997 | Redford |
| 5,661,651 A | 8/1997 | Geschke et al. |
| 5,663,496 A | 9/1997 | Handfield et al. |
| 5,698,353 A | 12/1997 | Jeong |
| 5,706,247 A | 1/1998 | Merritt et al. |
| 5,731,516 A | 3/1998 | Handfield et al. |
| 5,731,763 A | 3/1998 | Herweck |
| 5,732,283 A * | 3/1998 | Rose et al. ............ 710/16 |
| 5,741,966 A | 4/1998 | Handfield et al. |
| 5,808,558 A | 9/1998 | Meek et al. |
| 5,838,229 A | 11/1998 | Robinson, III |
| 5,841,390 A | 11/1998 | Tsui |
| 5,844,131 A | 12/1998 | Gabelmann et al. |
| 5,880,363 A | 3/1999 | Meyer et al. |
| 5,883,305 A | 3/1999 | Jo et al. |
| 5,900,808 A | 5/1999 | Lebo |
| 5,926,087 A | 7/1999 | Busch et al. |
| 5,959,751 A | 9/1999 | Darbee |
| 5,963,128 A | 10/1999 | McClelland |
| 5,965,808 A | 10/1999 | Normann et al. |
| 6,002,450 A | 12/1999 | Darbee |
| 6,005,486 A | 12/1999 | Fridley |
| 6,011,463 A | 1/2000 | Cormier, Sr. |
| 6,014,092 A | 1/2000 | Darbee |
| 6,018,993 A | 2/2000 | Normann et al. |
| 6,021,319 A | 2/2000 | Tigwell |
| 6,034,597 A | 3/2000 | Normann et al. |
| 6,078,270 A | 6/2000 | Shim |
| 6,087,930 A | 7/2000 | Kulka et al. |
| 6,112,165 A | 8/2000 | Uhl et al. |
| 6,124,786 A | 9/2000 | Normann et al. |
| 6,154,658 A | 11/2000 | Casi |
| 6,155,119 A | 12/2000 | Normann et al. |
| 6,169,480 B1 | 1/2001 | Uhl et al. |
| 6,169,907 B1 | 1/2001 | Chang et al. |
| 6,181,241 B1 | 1/2001 | Normann et al. |
| 6,192,747 B1 | 2/2001 | Fennel |
| 6,194,999 B1 | 2/2001 | Uhl et al. |
| 6,201,819 B1 | 3/2001 | Luders |
| 6,204,758 B1 | 3/2001 | Wacker et al. |
| 6,208,341 B1 | 3/2001 | van Ee et al. |
| 6,218,936 B1 | 4/2001 | Imao |
| 6,259,361 B1 | 7/2001 | Robillard et al. |
| 6,271,748 B1 | 8/2001 | Derbyshire et al. |
| 6,275,148 B1 | 8/2001 | Takamura et al. |
| 6,297,731 B1 | 10/2001 | Flick |
| 6,298,095 B1 | 10/2001 | Kronestedt et al. |
| 6,333,698 B1 | 12/2001 | Roddy |
| 6,362,731 B1 | 3/2002 | Lill |
| 6,369,703 B1 | 4/2002 | Lill |
| 6,396,408 B2 | 5/2002 | Drummond et al. |
| 6,400,263 B1 | 6/2002 | Kokubo |
| 6,408,232 B1 | 6/2002 | Cannon et al. |
| 6,438,467 B1 | 8/2002 | Pacsai |
| 6,441,728 B1 | 8/2002 | Dixit et al. |
| 6,445,286 B1 | 9/2002 | Kessler et al. |
| 6,446,502 B1 | 9/2002 | Normann et al. |
| 6,453,737 B2 | 9/2002 | Young et al. |
| 6,463,798 B2 | 10/2002 | Niekerk et al. |
| 6,469,621 B1 | 10/2002 | Vredevoogd et al. |
| 6,477,165 B1 | 11/2002 | Kosco |
| 6,486,773 B1 | 11/2002 | Bailie et al. |
| 6,489,888 B1 | 12/2002 | Honeck et al. |
| 6,490,452 B1 | 12/2002 | Boscovic et al. |
| 6,507,306 B1 | 1/2003 | Griesau |
| 6,518,891 B2 | 2/2003 | Tsutsui et al. |
| 6,567,032 B1 | 5/2003 | Mullaly |
| 6,571,617 B2 | 6/2003 | Van Niekerk et al. |
| 6,612,165 B2 | 9/2003 | Juzswik et al. |
| 6,622,552 B1 | 9/2003 | Delaporte |
| 6,630,885 B2 | 10/2003 | Hardman et al. |
| 6,633,229 B1 | 10/2003 | Normann et al. |
| 6,662,642 B2 | 12/2003 | Breed et al. |
| 6,667,687 B1 | 12/2003 | DeZori |
| 6,681,164 B2 | 1/2004 | Berghoff et al. |
| 6,704,364 B1 * | 3/2004 | Lim et al. ............ 375/257 |
| 6,705,155 B2 | 3/2004 | Katou |
| 6,710,708 B2 | 3/2004 | McClelland et al. |
| 6,737,965 B2 | 5/2004 | Okubo |
| 6,738,697 B2 | 5/2004 | Breed |
| 6,747,590 B1 | 6/2004 | Weber |
| 6,750,761 B1 | 6/2004 | Newman |
| 6,774,778 B2 | 8/2004 | Lin |
| 6,778,380 B2 | 8/2004 | Murray |
| 6,788,193 B2 | 9/2004 | King et al. |
| 6,794,993 B1 | 9/2004 | Kessler et al. |
| 6,801,872 B2 | 10/2004 | Normann et al. |
| 6,804,999 B2 | 10/2004 | Okubo |
| 6,822,603 B1 | 11/2004 | Crimmins et al. |
| 6,828,905 B2 | 12/2004 | Normann et al. |
| 6,832,573 B2 | 12/2004 | Evans et al. |
| 6,871,157 B2 | 3/2005 | Lefaure |
| 6,879,252 B2 | 4/2005 | DeZorzi et al. |
| 6,885,282 B2 | 4/2005 | Desai |
| 6,885,292 B2 | 4/2005 | Katou |
| 6,885,293 B2 | 4/2005 | Okumura |
| 6,885,296 B2 | 4/2005 | Hardman et al. |
| 6,888,471 B2 | 5/2005 | Elsner et al. |
| 6,897,770 B2 | 5/2005 | Lill |
| 6,904,796 B2 | 6/2005 | Pacsai et al. |
| 6,906,624 B2 | 6/2005 | McClelland et al. |
| 6,910,627 B1 | 6/2005 | Simpson-Young et al. |
| 6,914,523 B2 | 7/2005 | Munch et al. |
| 6,915,146 B1 | 7/2005 | Nguyen et al. |
| 6,915,229 B2 | 7/2005 | Taguchi et al. |
| 6,919,798 B2 | 7/2005 | Ide |
| 6,920,785 B2 | 7/2005 | Toyofuku |
| 6,922,140 B2 | 7/2005 | Hernando et al. |
| 6,927,679 B2 | 8/2005 | Taguchi et al. |
| 6,941,803 B2 | 9/2005 | Hirohama et al. |
| 6,972,671 B2 | 12/2005 | Normann et al. |
| 6,983,649 B2 | 1/2006 | Katou |
| 6,996,418 B2 | 2/2006 | Teo et al. |
| 7,002,455 B2 | 2/2006 | Buck et al. |
| 7,010,968 B2 | 3/2006 | Stewart et al. |
| 7,015,801 B1 | 3/2006 | Juzswik |
| 7,017,403 B2 | 3/2006 | Normann et al. |
| 7,034,661 B2 | 4/2006 | Lonsdale et al. |
| 7,039,397 B2 | 5/2006 | Chuey |
| 7,042,348 B2 | 5/2006 | Schulze et al. |
| 7,050,794 B2 | 5/2006 | Chuey et al. |
| 7,084,749 B1 | 8/2006 | Honeck et al. |
| 7,084,751 B2 | 8/2006 | Klamer |
| 7,088,226 B2 | 8/2006 | McClelland et al. |
| 7,095,316 B2 | 8/2006 | Kachouh et al. |
| 7,096,003 B2 | 8/2006 | Joao et al. |
| 7,103,460 B1 | 9/2006 | Breed |
| 7,104,438 B2 | 9/2006 | Benedict |
| 7,113,083 B2 | 9/2006 | Suitsu |
| 7,116,213 B2 | 10/2006 | Thiesen et al. |
| 7,116,218 B2 | 10/2006 | Ogawa et al. |
| 7,120,430 B2 | 10/2006 | Christenson et al. |
| 7,137,296 B2 | 11/2006 | Shida et al. |
| 7,148,793 B2 | 12/2006 | Lin |
| 7,161,466 B2 | 1/2007 | Chuey |
| 7,161,476 B2 | 1/2007 | Hardman et al. |

(56) References Cited

U.S. PATENT DOCUMENTS

| | | |
|---|---|---|
| 7,164,117 B2 | 1/2007 | Breed et al. |
| 7,173,520 B2 | 2/2007 | Desai et al. |
| 7,224,269 B2 | 5/2007 | Miller et al. |
| 7,243,535 B2 | 7/2007 | Shimura |
| 7,254,994 B2 | 8/2007 | Schulze et al. |
| 7,307,480 B2 | 12/2007 | Shiu et al. |
| 7,315,240 B2 | 1/2008 | Watabe |
| 7,369,491 B1 | 5/2008 | Beshai et al. |
| 7,380,450 B2 | 6/2008 | Durif |
| 7,414,523 B2 | 8/2008 | Li et al. |
| 7,453,350 B2 | 11/2008 | Kachouh et al. |
| 7,508,762 B2 | 3/2009 | Ohtani |
| 7,512,109 B2 | 3/2009 | Trott et al. |
| 7,518,495 B2 | 4/2009 | Tang et al. |
| 7,519,011 B2 | 4/2009 | Petrus et al. |
| 7,535,841 B1 | 5/2009 | Beshai et al. |
| 7,663,502 B2 | 2/2010 | Breed |
| 7,688,192 B2 | 3/2010 | Kenny et al. |
| 7,697,497 B2 | 4/2010 | Grube et al. |
| 7,817,543 B2 | 10/2010 | Beshai et al. |
| 7,884,707 B2 | 2/2011 | Wittliff et al. |
| 7,885,603 B2 | 2/2011 | Santavicca |
| 7,895,886 B2 | 3/2011 | Tozawa et al. |
| 7,948,364 B2 | 5/2011 | Lin et al. |
| 8,013,725 B2 | 9/2011 | Murata et al. |
| 8,019,323 B2 | 9/2011 | Jheng et al. |
| 8,027,359 B2 | 9/2011 | Iwamura |
| 8,031,598 B2 | 10/2011 | Beshai et al. |
| 8,035,257 B2 | 10/2011 | Fornage |
| 8,049,533 B1 | 11/2011 | Lin |
| 8,082,579 B2 | 12/2011 | Shimizu et al. |
| 8,155,617 B2 | 4/2012 | Magnusson et al. |
| 8,185,093 B2 | 5/2012 | Jheng et al. |
| 8,319,378 B2 | 11/2012 | Fornage |
| 8,330,594 B2 | 12/2012 | Suzuki et al. |
| 8,332,104 B2 | 12/2012 | Greer et al. |
| 2001/0050611 A1 | 12/2001 | Achterholt |
| 2002/0030592 A1 | 3/2002 | Laitsaari et al. |
| 2002/0059825 A1 | 5/2002 | Lundqvist |
| 2002/0067285 A1 | 6/2002 | Lill |
| 2002/0075145 A1 | 6/2002 | Hardman et al. |
| 2002/0084895 A1 | 7/2002 | Dixit et al. |
| 2002/0086708 A1 | 7/2002 | Teo et al. |
| 2002/0121132 A1 | 9/2002 | Breed et al. |
| 2002/0126005 A1 | 9/2002 | Hardman et al. |
| 2002/0130803 A1 | 9/2002 | Conway et al. |
| 2002/0144134 A1 | 10/2002 | Watanabe et al. |
| 2002/0168795 A1 | 11/2002 | Schuumans |
| 2002/0186320 A1 | 12/2002 | Carlsgaard |
| 2002/0190852 A1 | 12/2002 | Lin |
| 2003/0005759 A1 | 1/2003 | Breed et al. |
| 2003/0009270 A1 | 1/2003 | Breed |
| 2003/0050070 A1 | 3/2003 | Mashinsky et al. |
| 2003/0079537 A1 | 5/2003 | Luce |
| 2003/0080860 A1 | 5/2003 | Stewart et al. |
| 2003/0080861 A1 | 5/2003 | Okubo |
| 2003/0095553 A1 | 5/2003 | Shiomoto et al. |
| 2003/0110851 A1 | 6/2003 | Tsujita |
| 2003/0112138 A1 | 6/2003 | Marguet et al. |
| 2003/0117276 A1 | 6/2003 | Marguet et al. |
| 2003/0117277 A1 | 6/2003 | Marguet et al. |
| 2003/0131297 A1 | 7/2003 | Fischel et al. |
| 2003/0179082 A1 | 9/2003 | Ide |
| 2003/0197594 A1 | 10/2003 | Olson et al. |
| 2003/0197595 A1 | 10/2003 | Olson et al. |
| 2003/0197603 A1 | 10/2003 | Stewart et al. |
| 2003/0228879 A1 | 12/2003 | Witkowski |
| 2004/0039509 A1 | 2/2004 | Breed |
| 2004/0041698 A1 | 3/2004 | Lin |
| 2004/0061601 A1 | 4/2004 | Freakes |
| 2004/0113765 A1 | 6/2004 | Suitsu |
| 2004/0130442 A1 | 7/2004 | Breed et al. |
| 2004/0149025 A1 | 8/2004 | Toyofuku |
| 2004/0172179 A1 | 9/2004 | Miwa |
| 2004/0174246 A1 | 9/2004 | Mitchell |
| 2004/0203370 A1 | 10/2004 | Luo et al. |
| 2004/0215382 A1 | 10/2004 | Breed et al. |
| 2005/0039103 A1 | 2/2005 | Azenko et al. |
| 2005/0046584 A1 | 3/2005 | Breed |
| 2005/0075145 A1 | 4/2005 | Dvorak et al. |
| 2005/0104722 A1 | 5/2005 | Tang et al. |
| 2005/0134446 A1 | 6/2005 | Stewart et al. |
| 2005/0156722 A1 | 7/2005 | McCall et al. |
| 2005/0179530 A1 | 8/2005 | Stewart et al. |
| 2005/0192727 A1 | 9/2005 | Shostak et al. |
| 2005/0264405 A1 | 12/2005 | Ueda |
| 2006/0001535 A1 | 1/2006 | Hafele et al. |
| 2006/0006992 A1 | 1/2006 | Daiss et al. |
| 2006/0012475 A1 | 1/2006 | Froitzheim et al. |
| 2006/0017554 A1 | 1/2006 | Stewart et al. |
| 2006/0022813 A1 | 2/2006 | Schulze et al. |
| 2006/0025897 A1 | 2/2006 | Shostak et al. |
| 2006/0044125 A1 | 3/2006 | Pierbon |
| 2006/0114107 A1 | 6/2006 | Kim et al. |
| 2006/0145829 A1 | 7/2006 | Watabe |
| 2006/0148456 A1 | 7/2006 | Chuey |
| 2006/0161327 A1 | 7/2006 | Emmerich et al. |
| 2006/0187014 A1 | 8/2006 | Li et al. |
| 2006/0192661 A1 | 8/2006 | Gerardiere |
| 2006/0201241 A1 | 9/2006 | Durif |
| 2006/0217850 A1 | 9/2006 | Blaker et al. |
| 2006/0235641 A1 | 10/2006 | Fink et al. |
| 2006/0273889 A1 | 12/2006 | Schulze et al. |
| 2007/0063814 A1 | 3/2007 | Olson et al. |
| 2007/0069947 A1 | 3/2007 | Banet et al. |
| 2007/0090936 A1 | 4/2007 | Nornes |
| 2007/0176736 A1 | 8/2007 | Chuey et al. |
| 2007/0182531 A1 | 8/2007 | Kuchler |
| 2007/0190993 A1 | 8/2007 | Chuey et al. |
| 2007/0194898 A1 | 8/2007 | Fukumori |
| 2007/0210920 A1 | 9/2007 | Panotopoulos |
| 2007/0223484 A1 | 9/2007 | Crowle et al. |
| 2007/0247294 A1 | 10/2007 | Baader et al. |
| 2007/0279201 A1 | 12/2007 | Casey et al. |
| 2008/0024287 A1 | 1/2008 | Boyle et al. |
| 2008/0037458 A1 | 2/2008 | Myszne |
| 2008/0062880 A1 | 3/2008 | Yew et al. |
| 2008/0080447 A1 | 4/2008 | Grube et al. |
| 2008/0094198 A1 | 4/2008 | Yu |
| 2008/0100430 A1 | 5/2008 | Kochie et al. |
| 2008/0143593 A1 | 6/2008 | Graziano et al. |
| 2008/0165688 A1 | 7/2008 | Beshai et al. |
| 2008/0173082 A1 | 7/2008 | Hettle et al. |
| 2008/0177441 A1 | 7/2008 | Marlett et al. |
| 2008/0204217 A1 | 8/2008 | Costello et al. |
| 2008/0205553 A1 | 8/2008 | Costello et al. |
| 2008/0211672 A1 | 9/2008 | Pei |
| 2008/0240283 A1 | 10/2008 | Iwamura |
| 2008/0256260 A1 | 10/2008 | Magnusson et al. |
| 2008/0285507 A1 | 11/2008 | Mukherjee et al. |
| 2008/0320243 A1 | 12/2008 | Mitsuzuka et al. |
| 2009/0033478 A1 | 2/2009 | Deniau et al. |
| 2009/0045930 A1 | 2/2009 | Fu |
| 2009/0067854 A1 | 3/2009 | Yokogawa et al. |
| 2009/0070863 A1 | 3/2009 | Shimizu et al. |
| 2009/0108992 A1 | 4/2009 | Shafer |
| 2009/0179747 A1 | 7/2009 | Lin et al. |
| 2009/0184815 A1 | 7/2009 | Suzuki et al. |
| 2009/0207859 A1 | 8/2009 | Beshai et al. |
| 2009/0231114 A1 | 9/2009 | Yu |
| 2009/0245803 A1* | 10/2009 | Garner et al. ................. 398/106 |
| 2009/0267751 A1 | 10/2009 | Kaleal |
| 2009/0291710 A1 | 11/2009 | Jheng et al. |
| 2009/0310477 A1 | 12/2009 | Lee et al. |
| 2010/0308987 A1 | 12/2010 | Haas et al. |
| 2011/0140876 A1 | 6/2011 | Deniau |
| 2011/0181321 A1 | 7/2011 | Matsudera |
| 2011/0211414 A1 | 9/2011 | Musha |
| 2011/0250860 A1 | 10/2011 | Lin |
| 2011/0267024 A1 | 11/2011 | Halberstadt |
| 2011/0294548 A1 | 12/2011 | Jheng et al. |
| 2012/0117788 A1 | 5/2012 | Deniau |
| 2012/0119895 A1 | 5/2012 | Deniau |

(56) References Cited

U.S. PATENT DOCUMENTS

| | | | |
|---|---|---|---|
| 2012/0147184 A1 | 6/2012 | Siann et al. | |
| 2012/0185110 A1 | 7/2012 | Deniau et al. | |
| 2012/0274461 A1 | 11/2012 | Colombo et al. | |

FOREIGN PATENT DOCUMENTS

| | | |
|---|---|---|
| DE | 19720123 | 7/1998 |
| DE | 19924830 | 11/2000 |
| DE | 10014076 | 10/2001 |
| DE | 10040238 | 3/2002 |
| DE | 10247761 | 6/2003 |
| DE | 10217239 | 7/2003 |
| DE | 10207014 | 8/2003 |
| DE | 10307265 | 10/2003 |
| DE | 69529456 | 11/2003 |
| DE | 10247149 | 4/2004 |
| DE | 60108973 | 7/2005 |
| DE | 60202342 | 12/2005 |
| DE | 60023387 | 7/2006 |
| DE | 102005004825 | 8/2006 |
| DE | 102005059009 | 6/2007 |
| DE | 102007039599 | 3/2008 |
| DE | 102008008237 | 8/2009 |
| DE | 102008033051 | 2/2010 |
| EP | 793579 | 9/1997 |
| EP | 1026016 | 8/2000 |
| EP | 1291230 | 3/2003 |
| EP | 1428694 | 6/2004 |
| EP | 1494877 | 1/2005 |
| EP | 1547827 | 6/2005 |
| EP | 1562162 | 8/2005 |
| EP | 1026015 | 5/2006 |
| EP | 1352763 | 4/2008 |
| EP | 1340629 | 6/2008 |
| GB | 2387032 | 10/2003 |
| GB | 2420415 | 5/2006 |
| JP | 62003537 | 1/1987 |
| JP | 63090407 | 4/1988 |
| JP | 05107134 | 4/1993 |
| JP | 8244423 | 9/1996 |
| JP | 2000142044 | 5/2000 |
| JP | 2000238515 | 9/2000 |
| JP | 2001080321 | 3/2001 |
| JP | 2003025817 | 1/2003 |
| JP | 2004-145474 | 5/2004 |
| JP | 2005289116 | 10/2005 |
| JP | 2006015832 | 1/2006 |
| JP | 2007200081 | 8/2007 |
| JP | 2007283816 | 11/2007 |
| JP | 2008137585 | 6/2008 |
| KR | 2003068216 | 8/2003 |
| RU | 2238190 | 10/2004 |
| WO | 94/20317 | 9/1994 |
| WO | 9422693 | 10/1994 |
| WO | 99/08887 | 2/1999 |
| WO | 0072463 | 11/2000 |
| WO | 0145967 | 6/2001 |
| WO | 02/094588 | 11/2002 |
| WO | 03016079 | 2/2003 |
| WO | 2004038674 | 5/2004 |
| WO | 2005085651 | 9/2005 |
| WO | 2005116603 | 12/2005 |
| WO | 2009/006518 | 1/2008 |
| WO | 2008/103973 | 8/2008 |
| WO | 2008-106387 A1 | 9/2008 |
| WO | 2008107430 | 9/2008 |

OTHER PUBLICATIONS

International Search Report and Written Opinion dated Sep. 28, 2012, from corresponding International Patent Application No. PCT/US2011/047112.

Jeff Burgess, "Tire Pressure Monitoring System Reference Design", Tire Pressure Monitor System Demo, AN1951/D, Rev 1, May 2003, Motorola, Inc., 2003 (24 pgs.).

"Motorola's MPXY8000 Series Tire Pressure Monitoring Sensors", Motorola Sensor Products Division Transportation & Standard Products Group, Motorola, Inc., May, 2003 (22 pgs.).

Alfred Pohl et al. "Wirelessly Interrogable Surface Acoustic Wave Sensors for Vehicular Applications", IEEE Transactions on Instrumentation and Measurement vol. 46, No. 4, IEEE, Aug. 1997 (8 pgs.).

"Tire pressure Warning System Using Direct Measurement Method (SOARER)" G0880A ISSN: 0388-3841, vol. 51 No. 7, pp. 174-179, Toyota Motor Corporation, May 2, 2002 (6 pgs.).

"Sony Remote Commander Operating Instructions RM-V701/V801", 1998, Sony Corporation.

"Philips Magnavox 4 Function with Back Lighted Keypad Universal Remote" Operating Instructions, printed Oct. 2012, Philips Electronics North America Corporation.

"RadioShack 8-In-One Touch Screen Remote Control", Owner's Manual, 2001, RadioShack Corporation.

Kais Mnif, "A Smart Tire Pressure Monitoring System", Sensors Magazine, Nov. 1, 2001.

International Search Report and Written Opinion dated Sep. 28, 2012, from corresponding International Patent Application No. PCT/US2011/047108.

International Search Report dated Apr. 6, 2012, from corresponding International Patent Application No. PCT/US2011/047087.

International Search Report and Written Opinion mailed on Oct. 15, 2008, for Application No. PCT/US2008/069006.

International Preliminary Report on Patentability mailed on Jan. 14, 2010, for Application No. PCT/US2008/069006.

Chinese Office Action mailed on Apr. 19, 2011, for Chinese Application 200880023390.7 (Corresponding to PCT/US2008/069006).

Chinese Office Action (first) mailed on Feb. 16, 2012, for Chinese Application 200880023390.7 (Corresponding to PCT/US2008/069006).

Chinese Office Action (third) mailed on Oct. 10, 2012, for Chinese Application 200880023390.7 (Corresponding to PCT/US2008/069006).

Japanese Office Action mailed on Jun. 7, 2012, for JP Application 2010-515252 (Corresponding to PCT/US2008/069006).

International Search Report and Written Opinion dated Sep. 28, 2012, from corresponding International Patent Application No. PCT/US2011/047104.

Germany Office Action dated Nov. 19, 2012.

Germany Office Action dated Sep. 17, 2007.

Preliminary Invalidity Contentions of Defendant Continental Automotive Systems US, Inc.; dated Jan. 17, 2012, , In the United States District Court for Western District of Virginia Lynchburg Division, Civil Action No. 6:11-CV-00014-NKM.

Amended Invalidity Contentions of Defendant Continental Automotive Systems US, Inc.; dated Jan. 18, 2012, , In the United States District Court for Eastern District of Michigan Southern Division, Civil Action No. 2:12-cv-10715-SJM-MJH.

Plaintiffs' Initial Infringement Contentions; dated Dec. 15, 2011, In the United States District Court for Western District of Virginia Lynchburg Division, Civil Action No. 6:11-CV-00014-NKM-RSB.

Joint Claim Construction and Prehearing Statement, dated Jun. 11, 2012, from co-pending litigation: *Schrader-Bridgeport Int'l, Inc.* v. *Continental Automotive Sys, US, Inc.*, case docket No. 2:12-cv-10715-SJM-MJH, (filed Feb. 16, 2012, E.D. Mich.).

Plaintiffs' Opening Claim Construction Brief, dated Jun. 26, 2012, from co-pending litigation: *Schrader-Bridgeport Int'l, Inc.* v. *Continental Automotive Sys. US, Inc.*, case docket No. 2:12-cv-10715-SJM-MJH, (filed Feb. 16, 2012, E.D. Mich.).

USPTO Translation JP2003025817A, translated from Japanese by Schreiber Translations, Inc., Feb. 2013.

Jeff Burgess "TPMS Demonstration Kit", AN1943/D, Rev 1, Apr. 2002, Motorola, Inc., 2002 (16 pgs.).

\* cited by examiner

PROTOCOL PROTECTION

BACKGROUND

1. Field of the Invention

The present invention is generally related to a system for communicating data.

2. Description of Related Art

Many systems communicate wirelessly or over common busses such that the communication medium is shared by multiple devices. This scenario has become more prevalent with the introduction of wireless communication technologies that are being applied to a multitude of environments including for example, intra-vehicle communications. In one example, many sensors and peripheral devices may communicate with a vehicle controller over radio frequency (RF) communications. While this provides a great deal of flexibility and reduced cabling complexity, this scenario presents other complications. For example, RF communications that have the same RF frequency and the same data rate, but different protocols, can be misinterpreted by a single receiver. For example, it is possible that a message can be decoded incorrectly thereby providing the wrong information to the controller. This could happen even if a check sum is used. In one example, a first protocol message may be interpreted according to a second protocol and the value in the bit position of the check sum may happen to the match the correct check sum for the message interpreted according to a second protocol which is different from the first protocol.

SUMMARY

A system may be provided that generates a message according to a first protocol for communication with a controller and then analyzes the message with respect to a second protocol. If the message as analyzed by the second protocol produces an appropriate check sum value in the appropriate byte, then a value in the message may be changed such that the message interpreted according to the second protocol does not provide a proper check sum. Therefore, the message would not be accepted by a controller interpreting the message under the second protocol.

Further objects, features and advantages of this invention will become readily apparent to persons skilled in the art after a review of the following description, with reference to the drawings and claims that are appended to and form a part of this specification.

DETAILED DESCRIPTION

Figure 1:
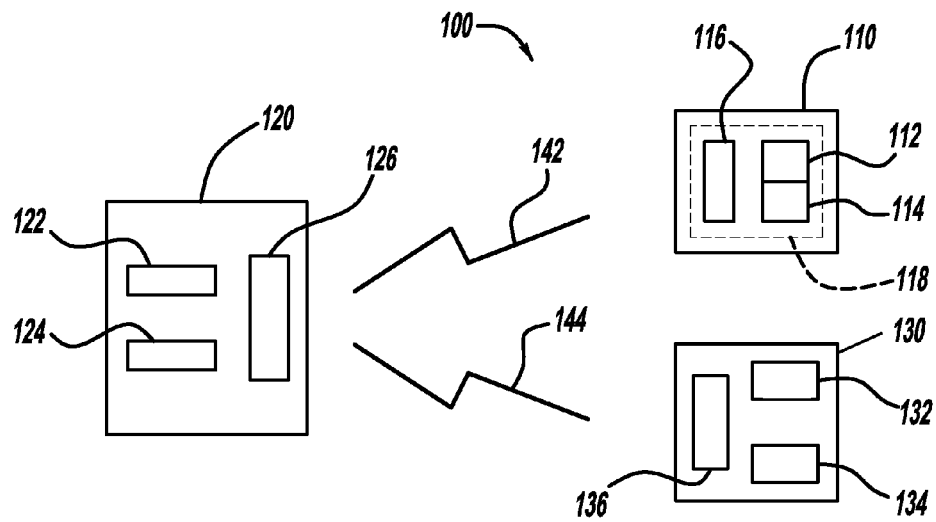
FIG. 1 is a schematic view of a system for communicating data.

Referring now to FIG. 1, a system 100 for communicating data is provided. The system includes a device 110. The device 110 may be a sensor such as a tire pressure sensor. Although, it is understood that the device 110 may be one of multiple devices including but not limited to a key fob, a garage door opener, a global positioning system, or one of many other telematics devices. The device 110 may include a processor 112 and storage 114. The processor 112 may be a microprocessor or a dedicated special purpose processor. The storage 114 may be memory, for example, random access memory, static memory, or a predetermined look up table. The device 110 also includes a transceiver 116 for transmitting and receiving data. The transceiver 116 may include a transmitter and a receiver. However, it is also possible that the device 110 may provide unidirectional communication and may only include a transmitter. Further, the processor 112, the storage 114, the transceiver 116, or any combination thereof may be included on an application specific integrated circuit (ASIC) that may be optimized for the particular application.

The device 110 may communicate using the transceiver 116 to a controller 120, for example, a vehicle controller. The communication may be over a bus or may be wireless communication as denoted by line 142. The controller 120 includes a transceiver 126 to receive the communication 142 from the device 110. The transceiver 126 may include a transmitter and a receiver to facilitate two-way communication. However, it is also possible that the controller 120 may only include a receiver for unidirectional communication with the device 110. The controller 120 includes a processor 122 and storage 124 such as memory. Further, other devices, such as device 130, may communicate with the controller as denoted by line 144.

The communication 144 may be a wireless communication, or at least communication that shares the same medium as communication 142. The device 130 may also be a sensor such as a tire pressure sensor, or one of various devices that may be present within a vehicle. In addition, the device 130 may include a microprocessor 132 and storage 134 for performing various tasks including for example, collecting sensor data and transmitting the sensor data to the controller 120 through a transceiver 136. In a motor vehicle environment, it is very possible that communication 142 and communication 144 may have the same radio frequency and the same data rate. However, it is also possible that communication 142 may be transmitted using a different protocol than communication 144. This leaves the possibility that the controller 120 may misinterpret data communicated by device 110 as discussed previously.

Accordingly, the device 110 may generate data packets to form a message that is to be transmitted by transceiver 116. However, the processor 112 may also analyze the message according to a number of other protocols stored in the storage 114. If the processor 112 determines that based on any of the plurality of stored protocols, the message may be interpreted to be a valid message under one of the other protocols, then the processor may change the message such that the message would not be interpreted as a valid message under any of the other stored protocols.

The processor 112 may analyze a message for example, by reading through the bytes of the message and verifying if a correct check sum according to the secondary protocol can be found in the appropriate byte. If the correct check sum according to the second protocol is found at the appropriate byte, the processor may change some of the data included in the message. For example, the processor may change the least significant bit of a value of measurement data which will not significantly affect performance. However, by changing the least significant bit of the value, the expected value for the check sum would change and, therefore, the check sum would no longer match the expected value for the second protocol.

Once the data has been altered, the message may be transmitted without fear of misinterpretation by the controller 120 under the second protocol.

Figure 2:
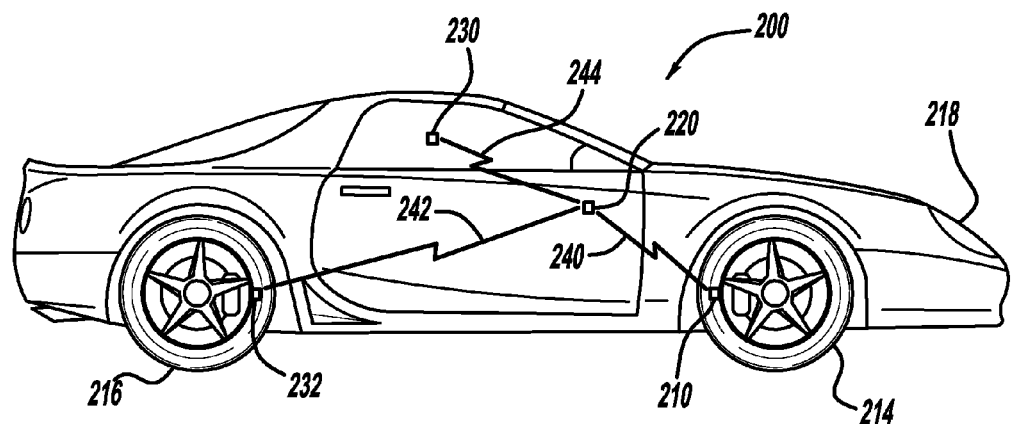
FIG. 2 a schematic view of a tire sensor communicating with a vehicle controller.

Now referring to FIG. 2, a vehicle 200 implementing the previously described system is provided. A device 210 may be a tire pressure sensor corresponding to device 110 of FIG. 1. The tire pressure sensor 210 may monitor the tire pressure within the tire 214 of the vehicle 200. The sensor 210 may communicate with the vehicle controller 220. The vehicle controller 220 may be located within the body 218 of the vehicle 200. In addition, other sensors may be in communication with the vehicle controller 220 through a wireless connection. For example, the device 230 may be a wireless phone, key fob, garage door opener, vehicle sensor, or any variety of other devices. Further, device 232 may be a second tire pressure sensor to measure the tire pressure of tire 216. Sensor 210 may be in communication with controller 220 as denoted by line 240. Similarly, device 230 may be in communication with controller 220, as denoted by line 244, and sensor 232 may be in communication with controller 220, as denoted by line 242. Each of the devices 210, 230, and 232 may be communicating wirelessly with the controller 220 simultaneously and, also, may be communicating at the same data rate and radio frequency. While one vehicle implementation is shown in FIG. 2, various other non-automotive implementations are also contemplated herein.

Figure 3:
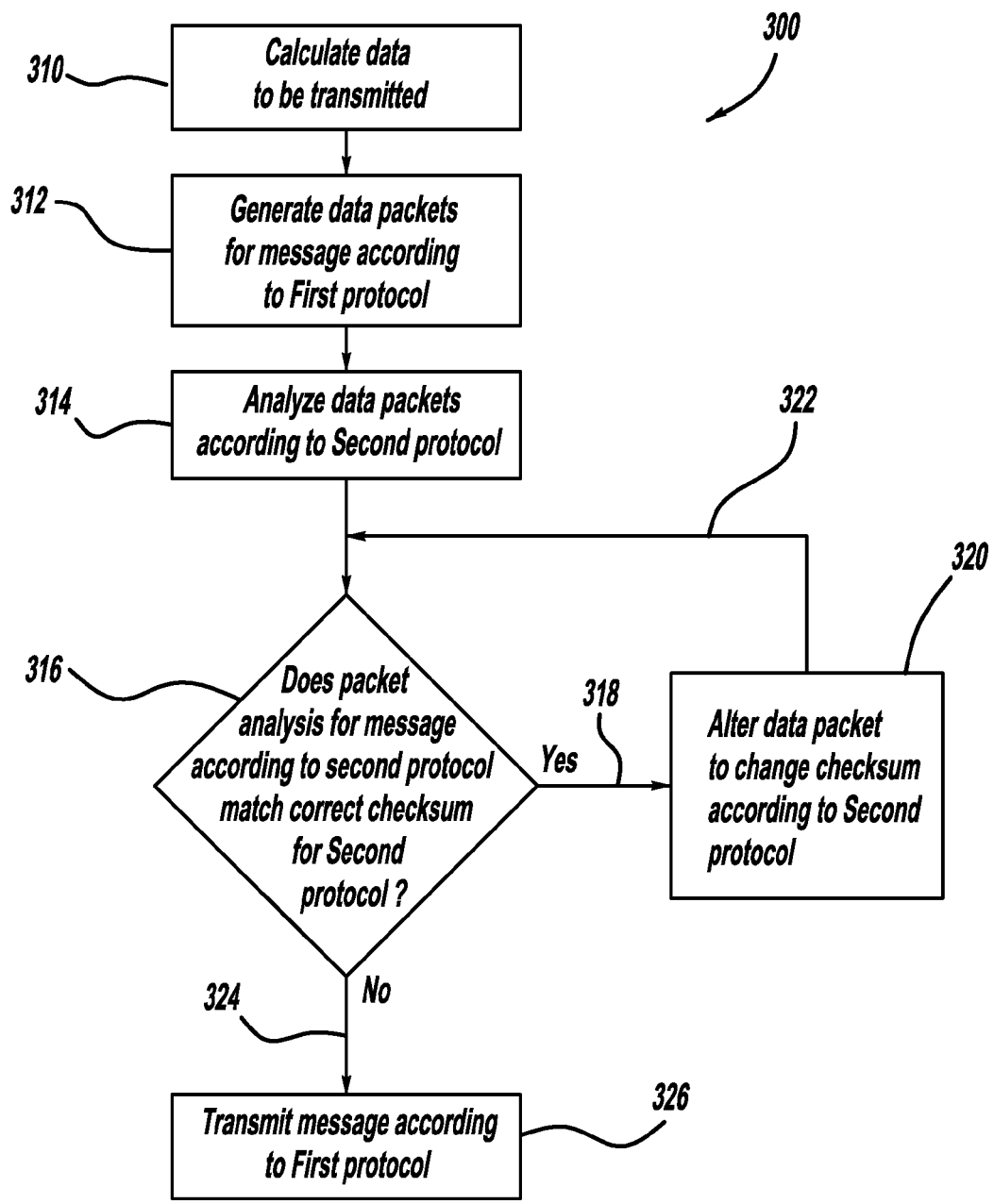
FIG. 3 is a flow chart illustrating a method for communicating data.

Now referring to FIG. 3, a method 300 for communicating data is provided. The method starts in block 310 where data is prepared for transmission. The data may be measurement data, for example, data collected by a vehicle sensor such as a tire pressure sensor, a temperature sensor, or other vehicle sensor. In block 312, data packets are generated for a message according to a first protocol. The data may be partially formatted by a processor, for example, within the sensor. The data packets may then be analyzed according to a second protocol as denoted by block 314. In block 316, a system determines if the packet analysis for the message according to the second protocol provides a correct check sum in the appropriate byte. If the packet analysis does provide a correct check sum, the method follows line 318 to block 320. In block 320, a data packet is altered to change the check sum according to the second protocol. As such, any of the data prior to the corresponding check sum bits may be changed which would thereby cause a message interpreted according to the second protocol to have a different expected check sum. The data altered may be measurement data and, for example, may be the least significant bit of the measurement data. By changing the least significant bit, the other vehicle systems are less likely to be affected. The method may then follow line 322 to block 316, where the packet is analyzed again. If the packet analysis does not provide the correct check sum in block 316, the method follows line 324 to block 326. In block 326, the message is transmitted according to the first protocol. If the data is altered in block 320, then the message transmitted in block 326 is the altered message according to the first protocol. It is further noted that the system may check the message against many protocols and not just a single second protocol. Accordingly, the method may repeat steps 314, 316, and 320 indexing through each of the secondary protocols stored by the device.

Figure 4:
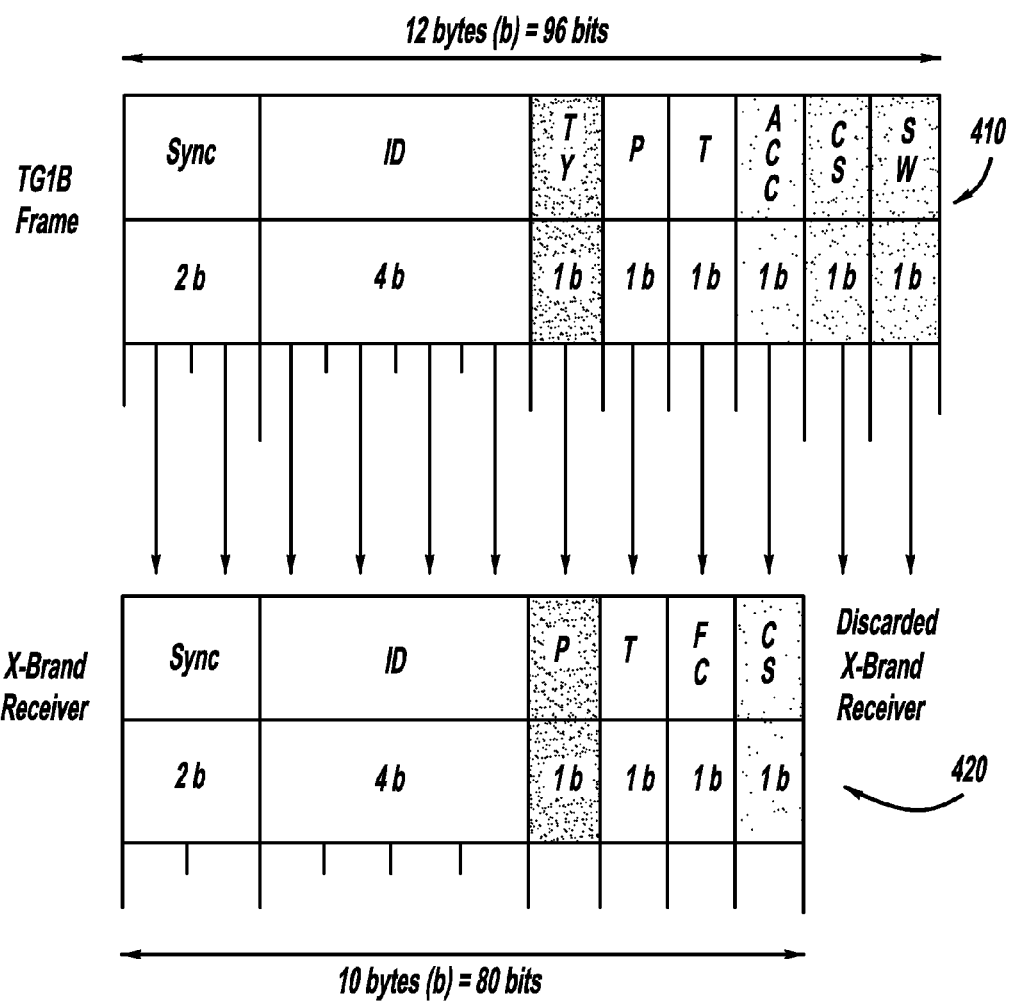
FIG. 4 is an illustration of a message being sent according to a first protocol and interpreted with regard to a second protocol.

One example of the analysis is provided with regard to FIG. 4. A first, second, and third protocol have the same data rate, modulation, and telegram start indicator (sync), such as a X-brand protocol, TG1B HT protocol, and a TG1B protocol. The X-brand telegram has 80 bits, TG1B HT has 96 bits and TG1B has 98 bits. A TG1B frame is denoted by arrow 410. Similarly, the X-brand receiver frame is denoted by arrow 420. Therefore, a X-brand receiver can receive the first 80 bits of a TG1B HT or TG1B frame and mistake the message for a X-brand telegram. This could lead to the false setting of a low pressure warning or prevention of a true low pressure warning.

The problem could occur when a X-brand vehicle equipped with a universal tire pressure monitor (TPM) sensor receives a TG1B frame from one of the universal TPM sensors. The TG1B frame is 96 bits while the X-brand receiver expects a frame of 80 bits. The TG1B frame provides a circuit of two bytes and an ID of four bytes. The sensor type TY is assigned one byte, the pressure P one byte, the temperature T one byte and the acceleration ACC one byte. The check sum is assigned one byte and SW is assigned one byte. Since the X-brand receiver only anticipates eighty bits, the last two bytes CS and SW of the TG1B frame are ignored. The Sync and ID that the X-brand receiver is expecting are matched to the corresponding Sync and ID of the TG1B frame. However, the rest of the corresponding bytes are offset.

As illustrated in FIG. 4, the type (TY), pressure (P), temperature (T), and acceleration (ACC) bytes of the TG1B frame would be received by the X-brand receiver as the P, T, FC, and CS bytes, respectively.

After seeing that the ID is valid, the X-brand receiver would perform the checksum calculation over the data bytes (ID, P, T, FC). As such, it is possible that the value for the ACC may be the correct check sum for the other bytes, ID, TY, P, and T. If the calculated checksum matches the received checksum byte (CS) then the frame will be taken as valid. In this case, the X-brand receiver will interpret the TG1B frame as a valid X-brand frame and the following incorrect mapping of data will occur TY to P, P to T, and T to FC. Therefore, the Universal TPM sensor should be aware of this possibility and should protect for this fault.

Before sending a TG1B frame, the TPM sensor can calculate a X-brand checksum with the data bytes ID, TY, P, T. If the calculated checksum matches the ACC data byte, then the least significant bit of the ACC data byte can be flipped. This would prevent the TPM sensor from sending a TG1B frame with the first 10 data bytes equal to a valid X-brand frame. In one implementation, the specific logic could implemented as follows:

IF X-brand-Type CS value of TG1B data (ID, TY, P, T) is equal to the ACC value of TG1B frame the sensor will flip the least significant bit of the TY value of the TG1B frame.

The TY value of the TG1B frame is the V_BAT value, a constant that is normally equal to 111 b, but will be set to 110 b in this case to invalidate the checksum.

However it is understood that, any of the previous data bytes may be changed to change the expected check sum for a X-brand frame. The sync and ID bytes would not be changed if the receiver is to recognize the sensor signal. As such, any of the TY, the P, or the T bytes may be changed. If TY is a sensor type and the wrong sensor type would be interpreted if the bits were changed, then it would make sense not the change the TY byte, but rather change the P or T byte. Accordingly, the least significant bit of the P or T byte may be flipped thereby changing the value of the byte by the smallest amount possible while still changing the expected check sum for a X-brand frame.

Figure 5:
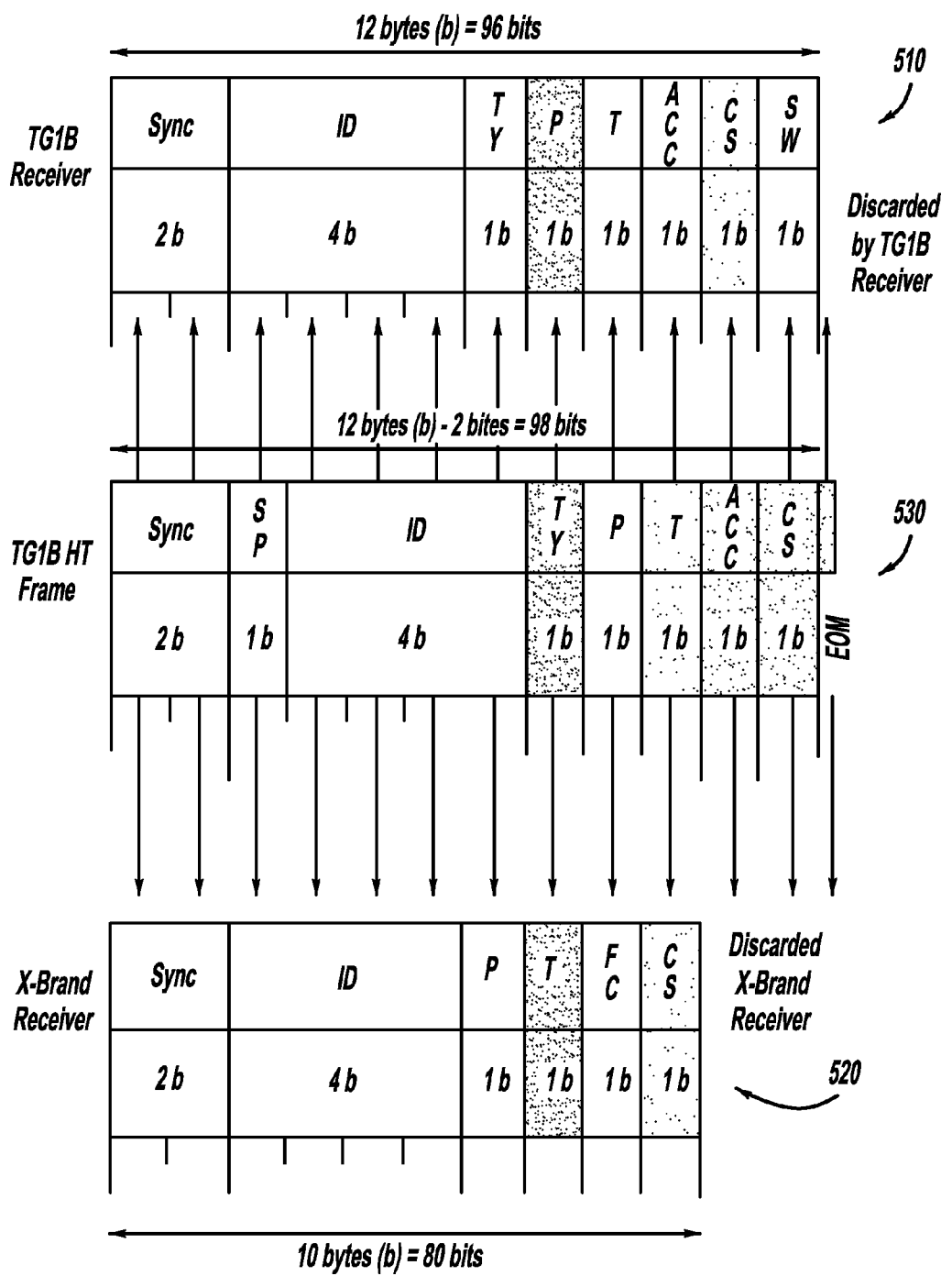
FIG. 5 is another illustration of a message sent according to a first protocol and interpreted according to a second protocol.

Now referring to FIG. 5, a TG1BHT frame 530 is shown and how it may be mistakenly mapped by a TG1B receiver 510 or a X-brand receiver 520. The TG1B receiver 510 expects 96 bits while the X-brand receiver 520 expects 80 bits. However, the TG1B HT frame 530 provides 98 bits and may be misinterpreted by either the TG1B receiver 510 or the X-brand receiver 520. As can be seen by the frame positioning, the check sum of the TG1B receiver corresponds to the ACC byte in the TG1B HT frame. Similarly, the checksum of the X-brand receiver corresponds to the T byte of the TG1B HT frame.

Accordingly, a similar error could occur as described above with regard to FIG. 4. Specifically, an error could occur on a X-brand receiver when a TG1B HT frame is received and on a TG1B receiver when a TG1B HT frame is received. Although the error would be less likely, because the ID bytes are not aligned. However, the same type of protection can be implemented for this scenario. One implementation of the logic for implementing the protection is provided in the three steps below:

1. IF X-brand-Type CS value of TG1B HT data (SP, ID, TV, P) is equal to the T value of TG1B HT frame then the sensor will set bit 1 of TV value of TG1B HT frame before transmitting TG1B HT frame.

Bits 1 and 0 of the TV byte are the Frame Number which is normally set to 01 (binary). In this case, it will be switched to 11 (binary), which will invalidate the X-brand checksum.

2. IF TG1B-Type CS value of TG1B HT data (SP, ID, TV, P, T) is equal to the ACC value of TG1B HT frame then the sensor will clear bit 0 of TV value of TG1B HT frame before transmitting TG1B HT frame.

(In this case, TV will be switched to 10 (binary), which will invalidate the TG1B checksum and maintain an invalid X-brand checksum.)

ELSE IF TG1B-Type CS value of TG1B HT data (SP, ID, TV, P, T) is equal to the ACC value of TG1B HT frame then the sensor will set bit 1 of TV value of TG1B HT frame before transmitting TG1B HT frame.

(In this case, bits 1 and 0 of the TV byte are the Frame Number which is normally set to 01 (binary). In this case, it will be switched to 11 (binary), which will invalidate the TG1B checksum.)

3. IF X-brand.Type CS value of TG1B HT data (SP, ID, TV, P) is equal to the T value of TG1B HT frame then the sensor will clear bit 0 of TV value of TG1B HT frame before transmitting TG1B HT frame.

In this case, it will be switched to 10 (binary), which will invalidate the X-brand checksum and maintain an invalid TG1B checksum.

However it is understood that, any of the previous data bytes may be changed to change the expected check sum for a X-brand frame or the TG1B frame. The sync and ID bytes would likely not be changed if the receiver is to recognize the sensor signal. As such, any of the SP, TY, P, T bits or even the ACC bits (the byte matched to the CS of the receiver) may be changed. Accordingly, the least significant bit of one of the parameters may be changed thereby changing the value of the parameter by the smallest amount possible while still changing the expected check sum for a X-brand frame or TG1B frame.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

We claim:

1. A system for transmitting data, the system comprising:
   a processor configured to generate data packets of a message according to a first protocol, the processor configured to analyze the message according to a second protocol and determine if the message provides a correct checksum according to the second protocol, the processor being configured to alter a data packet if the message provides the correct checksum; and
   a transmitter being configured to communicate with the processor, the transmitter being configured to transmit the message according to the first protocol.

2. The system according to claim 1, wherein the second protocol is one of a plurality of protocols and the processor is configured to analyze the message according to each protocol of the plurality of protocols.

3. The system according to claim 1, wherein the processor and the transmitter are incorporated into a sensor package.

4. The system according to claim 3, wherein the second protocol is one of a plurality of protocols and the processor is configured to analyze the message according to each protocol of the plurality of plurality of protocols, the plurality of protocols being stored within the sensor package.

5. The system according to claim 1, wherein the processor is an application specific integrated circuit and includes a lookup table for each of the plurality of protocols.

6. The system according to claim 1, wherein the data packet altered by the processor contains measurement data.

7. The system according to claim 1, wherein the processor is configured to alter the least significant bit of the data packet.

8. The system according to claim 1, wherein the transmitter is configured to transmit the message to a controller and the controller is configured to receive messages using both the first protocol and the second protocol.

9. A system for transmitting data, the system comprising:
   a sensor responsive to a vehicle parameter, the sensor comprising
      a processor being configured to generate data packets of a message according to a first protocol, the processor being configured to analyze the message according to a plurality of second protocols and determine if the message provides a correct checksum according to the plurality of second protocols, the processor being configured to alter a data packet if the message provides the correct checksum; and a transmitter configured to communicate with the processor, the transmitter being configured to transmit the message according to the first protocol; and a controller where the transmitter is configured to transmit the message to the controller and the controller is configured to receive messages using both the first protocol and the second protocol.

10. The system according to claim 9, wherein the plurality of second protocols are stored within the sensor.

11. The system according to claim 9, wherein the processor is an application specific integrated circuit and includes a lookup table for each of the plurality of protocols.

12. The system according to claim 9, wherein the data packet altered by the processor contains measurement data.

13. The system according to claim 9, wherein the processor is configured to alter the least significant bit of the data packet.

14. A method for transmitting data, the method comprising:

generating data packets of a message according to a first protocol, analyzing the message according to a second protocol determining if the message provides a correct checksum according to the second protocol altering a data packet if the message provides the correct checksum; and transmitting the message according to the first protocol.

15. The method according to claim 14, wherein the second protocol is one of a plurality of protocols and the message is analyzed according to each protocol of the plurality of protocols.

16. The method according to claim 15, further comprising storing the plurality of protocols.

17. The method according to claim 14, wherein the data packet that is altered contains measurement data.

18. The method according to claim 14, wherein the least significant bit of the data packet is altered.

19. The method according to claim 14, wherein the message is transmitted to a controller and the controller is configured to receive messages using both the first protocol and the second protocol.

20. In a computer readable storage medium having stored therein instructions executable by a programmed processor for transmitting data, the storage medium comprising instructions for:

generating data packets of a message according to a first protocol, analyzing the message according to a second protocol determining if the message provides a correct checksum according to the second protocol altering a data packet if the message provides the correct checksum; and transmitting the message according to the first protocol.

21. The computer readable storage medium according to claim 20, wherein the second protocol is one of a plurality of protocols and the message is analyzed according to each protocol of the plurality of protocols.

22. The computer readable storage medium according to claim 21, further comprising storing the plurality of protocols.

23. The computer readable storage medium according to claim 20, wherein the data packet that is altered contains measurement data.

24. The computer readable storage medium according to claim 20, wherein the least significant bit of the data packet is altered.

25. The computer readable storage medium according to claim 20, wherein the message is transmitted to a controller and the controller is configured to receive messages using both the first protocol and the second protocol.

\* \* \* \* \*